(12) United States Patent
Aggarwal et al.

(10) Patent No.: US 6,717,921 B1
(45) Date of Patent: Apr. 6, 2004

(54) METHOD FOR CONFIGURING A SHARED TREE FOR ROUTING TRAFFIC IN A MULTICAST CONFERENCE

(75) Inventors: Sudhir Aggarwal, Basking Ridge, NJ (US); Arun N Netravali, Westfield, NJ (US); Krishan K Sabnani, Westfield, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/573,783

(22) Filed: May 17, 2000

(51) Int. Cl.$^7$ .............................................. H04L 12/28
(52) U.S. Cl. ........................ 370/256; 370/390; 370/408; 709/252
(58) Field of Search ................................. 370/254, 255, 370/256, 351, 389, 390, 395.21, 408; 709/220, 238, 241, 252

(56) References Cited

U.S. PATENT DOCUMENTS

| | | | | |
|---|---|---|---|---|
| 5,291,477 A | * | 3/1994 | Liew ........................... | 370/238 |
| 5,541,927 A | * | 7/1996 | Kristol et al. ............... | 370/408 |
| 6,088,333 A | * | 7/2000 | Yang et al. .................. | 370/238 |
| 6,154,463 A | * | 11/2000 | Aggarwal et al. .......... | 370/408 |
| 6,321,271 B1 | * | 11/2001 | Kodialam et al. .......... | 709/241 |
| 6,363,319 B1 | * | 3/2002 | Hsu ............................. | 701/202 |
| 6,529,498 B1 | * | 3/2003 | Cheng ......................... | 370/351 |

OTHER PUBLICATIONS

Ahn A multicast tree algorithm considering maximum delay bound for real–time applications. Local Computer Networks, 1996., Proceedings 21st IEEE Conference on, Oct. 13–16, 1996 Page(s): 172–181.*

Ravindran Cost–optimal multicast trees for multi–source data flows in multimedia distribution. INFOCOM 2001. Twentieth Annual Joint Conference of the IEEE Computer and Communications Societies. Proceedings. IEEE, vol.: 2, 22–26 Apr. 2.*

Ahuja, Ravindra K., et al., *Network Flows: Theory, Algorithms and Applications,* Prentice Hall, Englewood Cliffs, NJ, 1993, pp. 598–638.

Kompella, Vachaspathi P., et al., "Multicast Routing for Multimedia Communication," IEEE/ACM Transactions on Networking, Vol, 1, No. 3, Jun. 1993, pp. 286–292.

Maxemchuk, Nicholas F., "Video Distribution on Multicast Networks," IEEE Journal on Selected Areas in Communications, vol. 15, No. 3, Apr. 1997, pp. 357–372.

Paul, Sanjoy, *Multicasting on the Internet and its Applications,* Kluwer Academic Publishers, Boston, MA, 1998, pp. 21–28 and 397–415.

* cited by examiner

*Primary Examiner*—Hassan Kizou
*Assistant Examiner*—Dmitry Levitan
(74) *Attorney, Agent, or Firm*—Matthew J. Hôdulik

(57) ABSTRACT

In a multicast network, a method is employed for selecting a low cost multicast conference tree subject to an end-to-end delay constraint for transmissions between any two nodes in the tree that terminate conference participants. The method employs a constrained minimum cost Steiner tree selection technique that integrates facilities costs and a delay constraint into a single objective function to be minimized as the tree is incrementally configured. The method also incorporates a unique path delay metric (delta diameter) that indicates the effect on end-to-end delay resulting from the incremental addition of a next node to the Steiner tree.

13 Claims, 8 Drawing Sheets

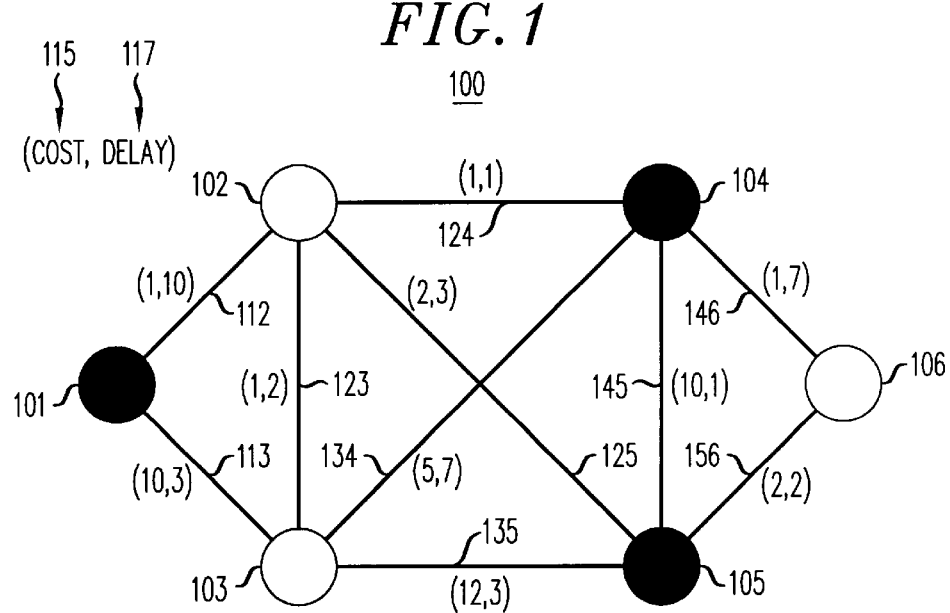

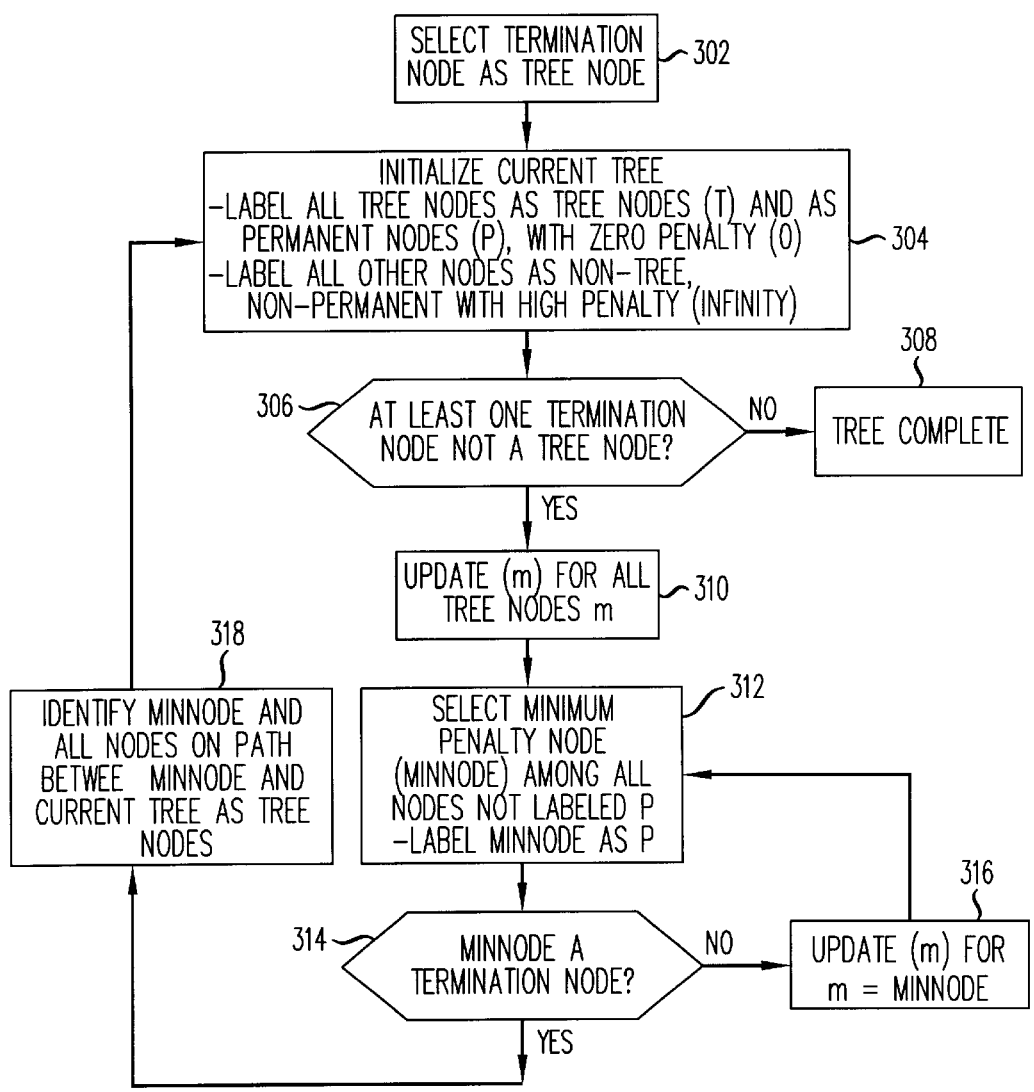

UPDATE (m)

FIG.6A
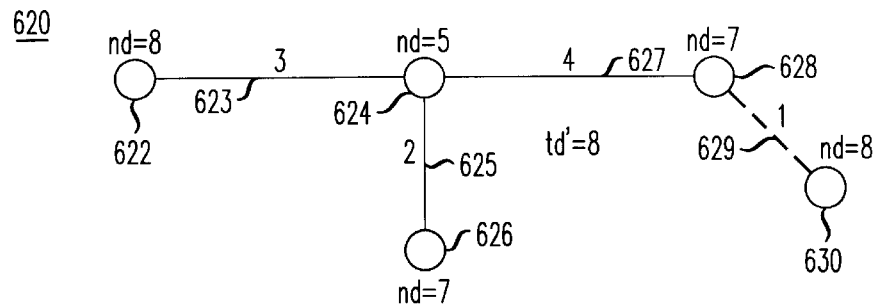
FIG.6B
621
|  | 622 | 624 | 626 | 628 | 630 | nd(638) |
|---|---|---|---|---|---|---|
| 622 | 0 | 3 | 5 | 7 | 8 | 8 — 644 |
| 624 | 3 | 0 | 2 | 4 | 5 | 5 |
| 626 | 5 | 2 | 0 | 6 | 7 | 7 |
| 628 | 7 | 4 | 6 | 0 | 1 | 7 |
| 630 | 8 | 5 | 7 | 1 | 0 | 8 — 646 |
640, 642
FIG.7A
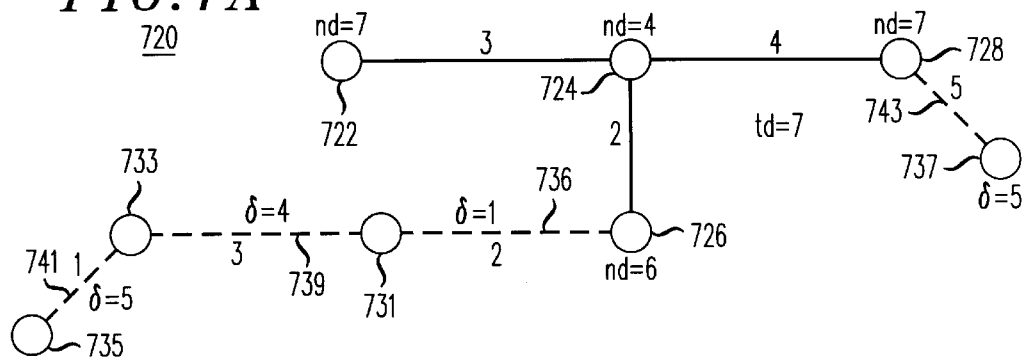
FIG.7B
|  | 722 | 724 | 726 | 728 | nd | td | 731 | dd |
|---|---|---|---|---|---|---|---|---|
| 722 | 0 | 3 | 5 | 7 | 7 |  | 7 |  |
| 724 | 3 | 0 | 2 | 4 | 4 |  | 4 |  |
| 726 | 5 | 2 | 0 | 6 | 6 |  | 2 |  |
| 728 | 7 | 4 | 6 | 0 | 7 | 7 | 8 |  |
| 731 | 7 | 4 | 2 | 8 | 752 |  | 0 | 1 — 756 |
750, 754

FIG. 7C

|     | 722 | 724 | 726 | 728 | 731 | nd | td      | 733 | dd |
|-----|-----|-----|-----|-----|-----|----|---------|-----|-----|
| 722 | 0   | 3   | 5   | 7   | 7   | 7  |         | 10  |    |
| 724 | 3   | 0   | 2   | 4   | 4   | 4  | ⌐752    | 7   |    |
| 726 | 5   | 2   | 0   | 6   | 2   | 6  |         | 5   |    |
| 728 | 7   | 4   | 6   | 0   | 8   | 7  | 7       | 11  | 1  |
| 731 | 7   | 4   | 2   | 8   | 0   |    |         | 3   | 4  |
| 733 | 10  | 7   | 5   | 11  | 3   |    | 754     | 0   |    |
|     |     |     | 762 |     |     |    |         |     | 758|

FIG. 7D

|     | 722 | 724 | 726 | 728 | 731 | 733 | nd | td   | 735 | dd |
|-----|-----|-----|-----|-----|-----|-----|----|------|-----|-----|
| 722 | 0   | 3   | 5   | 7   | 7   | 10  | 7  |      | 11  |    |
| 724 | 3   | 0   | 2   | 4   | 4   | 7   | 4  | ⌐752 | 8   |    |
| 726 | 5   | 2   | 0   | 6   | 2   | 5   | 6  |      | 6   |    |
| 728 | 7   | 4   | 6   | 0   | 8   | 11  | 7  | 7    | 12  |    |
| 731 | 7   | 4   | 2   | 8   | 0   | 3   |    |      | 4   | 1  ~756 |
| 733 | 10  | 7   | 5   | 11  | 3   | 0   |    | 754  | 1   | 4  ~758 |
| 735 | 11  | 8   | 6   | 12  | 4   | 1   |    |      | 0   | 5  ~760 |
|     |     |     | 764 |     |     |     |    |      |     |    |

FIG. 7E

|     | 722 | 724 | 726 | 728 | nd | td  | 737 | dd |
|-----|-----|-----|-----|-----|----|-----|-----|-----|
| 722 | 0   | 3   | 5   | 7   | 7  |     | 12  |    |
| 724 | 3   | 0   | 2   | 4   | 4  |     | 9   |    |
| 726 | 5   | 2   | 0   | 6   | 6  |     | 11  |    |
| 728 | 7   | 4   | 6   | 0   | 7  | 7   | 5   |    |
| 737 | 12  | 9   | 11  | 5   |    |     | 0   | 5 ~776 |
|     |     |     |     | 770 | 772| 774 |     |    |

FIG. 7F

|     | 722 | 724 | 726 | 728 | 737 | nd | td |
|-----|-----|-----|-----|-----|-----|----|-----|
| 722 | 0   | 3   | 5   | 7   | 12  | 12 |     |
| 724 | 3   | 0   | 2   | 4   | 9   | 9  ~778 |
| 726 | 5   | 2   | 0   | 6   | 11  | 11 |     |
| 728 | 7   | 4   | 6   | 0   | 5   | 7  |     |
| 737 | 12  | 9   | 11  | 5   | 0   | 12 | 12 ~780 |

820

US 6,717,921 B1

METHOD FOR CONFIGURING A SHARED TREE FOR ROUTING TRAFFIC IN A MULTICAST CONFERENCE

CROSS-REFERENCE TO RELATED APPLICATION

Related subject matter is disclosed in the co-pending, commonly assigned, U.S. patent application of Aggarwal et al., entitled "SYSTEM AND METHOD FOR MULTICAST CONFERENCING AND ONLINE DISCUSSION GROUPS", Ser. No. 08/917,344, filed on Aug. 26, 1997.

FIELD OF THE INVENTION

This invention relates to methods for routing multicast data communications. More specifically, it relates to a method for configuring a close-to-optimal Steiner tree for routing data communications traffic associated with a multicast conference call subject to a predetermined end-to-end delay requirement.

BACKGROUND OF THE INVENTION

Multicasting presents a communications paradigm in which communications initiated by a sending party are broadcast to a plurality of receiving parties. Internet Protocol (IP) multicasting applications, for example, represent a significant segment for multicasting applications. Typical IP applications for multicasting include audio and video conferencing, streaming audio and video applications, and document and software distribution (see, e.g., Sanjoy Paul, Multicasting On The Internet And Its Applications, Kluwer Academic Publishers, Boston, 1998, pp.9–10). Real time applications such as audio and video conferencing present stringent delay requirements for multicast packets transmitted over IP networks. Typical sender-to-receiver latency, for example, may be required to be less than 100 milliseconds. Multicast network facilities costs consumed represent an additional concern for IP multicast network operators.

In conventional multicast networks, trees are often employed to facilitate multicast routing (see, e.g., V. P. Kompella et al., "Multicast Routing for Multimedia Communication," IEEE/ACM Transactions On Networking, Vol. 1, No. 3, June 1993, pp. 286–292). Such trees are defined by a plurality of routers ("nodes") for transmitting multicast conference packets over a plurality of data transmission links ("arcs") that interconnect node pairs. Multicast conference participants ("senders" and "receivers") are terminated on at least a subset of the plurality of routers ("terminating nodes").

Multicast trees provide for efficient conference routing, as each packet that must be forwarded by a sender to a number of receivers need only be copied at each node that branches to at least two nodes or that serves at least two receivers. As a result, the sender's node is most often required to produce a number of copies that is fewer in number than the number of receivers. This may be contrasted, for example, with unicast methods that require the sender to produce individual packet copies for each intended receiver.

Several methods have been used to configure multicast trees in a manner that reduces facilities costs (see, e.g., Sanjoy Paul, op cit. at pg. 21). Such methods can be characterized as shortest path tree (SPT) methods, minimum cost tree (MCT) methods and constrained tree (CT) methods.

SPT methods are used to produce a multicast tree such that the cost of facilities between a selected sender and each identified receiver is minimized. MCT methods focus on minimizing total facilities costs for the multicast tree. CT methods focus on minimizing overall facilities costs subject to additional constraints.

A representative CT method used for multicast routing is the constrained Steiner tree method (see Kompella, op cit. at pp. 286–289). A minimum Steiner tree may be defined as a network tree which is constructed such that the sum of a series of "penalties" (for example, such as network facilities costs) that can be associated with each arc in the tree are minimized. A constrained Steiner tree may be heuristically constructed as "close-to-optimal," such that the tree approaches a theoretical minimum penalty subject to one or more constraints. For example, a typical constraint may require that the expected delay on each path between a sender and a receiver does not exceed a predetermined maximum.

Kompella discloses a constrained Steiner tree method directed to produce a multicast tree supporting one sender and a plurality of receivers. However, emerging conferencing applications in multicasting are requiring that each participant to be capable of acting either as a sender or a receiver. Therefore, it would be advantageous to develop a constrained Steiner tree method that produces a close-to-optimal Steiner tree for a multicast conference in which any participant may function as either a sender or a receiver.

SUMMARY OF THE INVENTION

The art is advanced by a novel and non-obvious method directed to configuring a close-to-optimal Steiner tree with low facilities cost constrained by a desired maximum end-to-end delay T between each pair of participants. The method begins by initializing the tree with a node that terminates at least one of the participants. While one or more nodes that terminate participants have not been added to the tree, additional nodes are incrementally selected from among nodes not yet selected or added to the tree such that each selected node adds a least additional penalty over its identified path to the current tree. When the selected node is a terminating node, the node is added to the tree along with any other selected nodes and arcs in its path to the tree.

The method further incorporates a penalty function that addresses the maximum delay constraint by using a Lagrangian-like relaxation technique to combine both cost and delay into a single incremental penalty function. In order to approach the maximum end-to-end delay constraint T between any pair of terminating nodes in the tree, a novel path delay metric ("delta diameter") is introduced that provides a measure of impact on the maximum expected end-to-end delay $\tau$ that would result from the addition of each incrementally selected node to the tree.

BRIEF DESCRIPTION OF THE DRAWING

The invention will be more fully understood from the following detailed description taken in connection with the accompanying drawing, in which:

FIG. 1 shows a first multicast network with associated costs and delays;

FIG. 2 illustrates a minimum Steiner tree selected from the multicast network 100 of FIG. 1;

FIGS. 3A and 3B depicts a method for configuring a close-to-optimal Steiner tree in a multicast network such as the network 100 of FIG. 1;

FIG. 6A depicts the Steiner tree of FIG. 5A with node diameters updated to reflect the addition of a node 630;

FIG. 6B depicts the table of FIG. 5B updated to reflect the addition of the node 630;

FIG. 7A depicts the Steiner tree of FIG. 5A with the addition of selected nodes 731, 733, 735 and 737;

FIGS. 7B through 7D show a table incrementally updated to track node diameters, tree diameters and delta diameters for selected nodes 731, 733 and 735, respectively;

FIG. 7E shows a table tracking node diameters, tree diameter and delta diameter for selected node 737;

FIG. 7F shows a table of FIG. 7E updated to reflect the addition of candidate node 737 as a tree node to Steiner tree 720 of FIG. 7A;

Figure 3B:
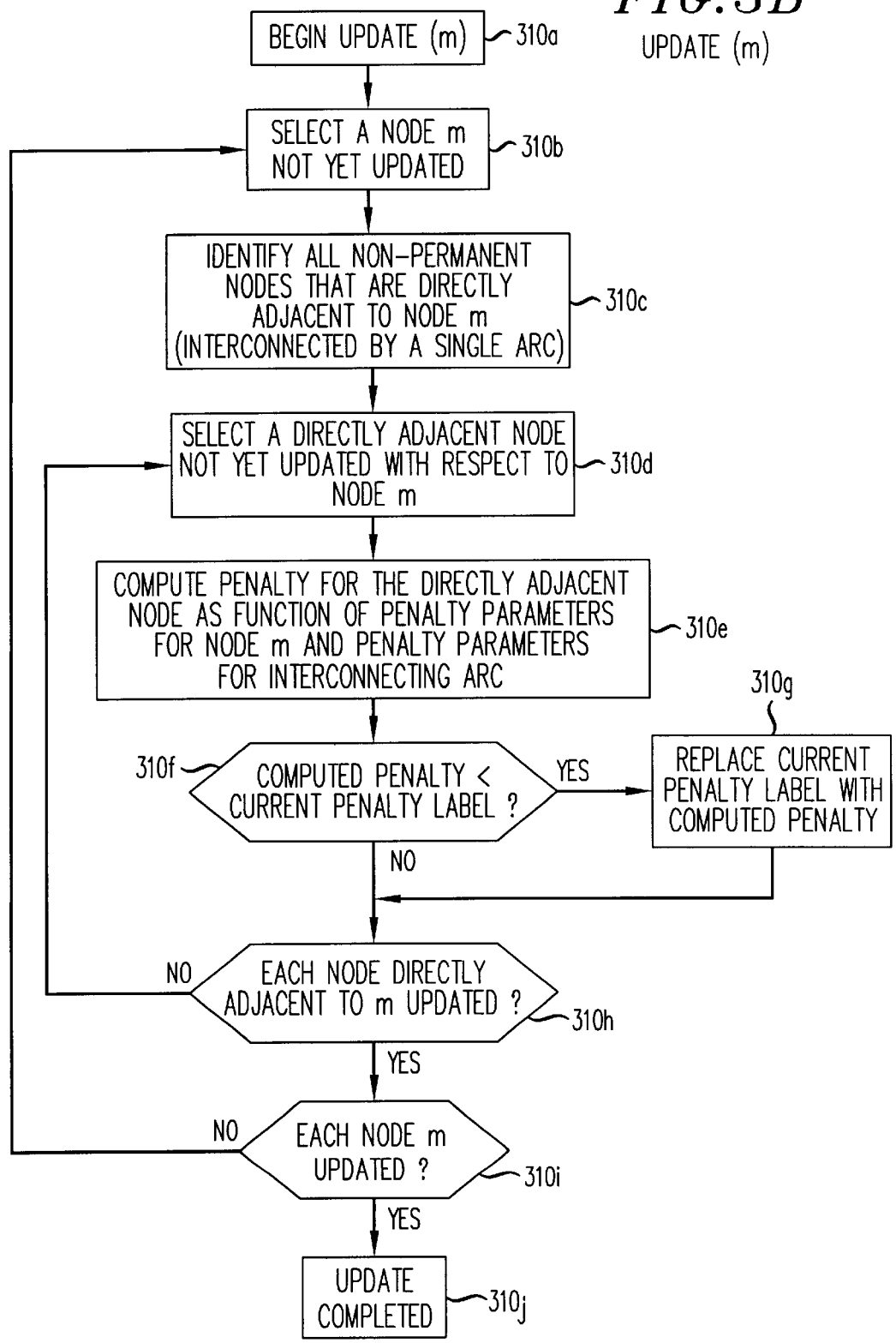

For consistency and ease of understanding, those elements of each figure that are similar or equivalent share identification numbers that are identical in the two least significant digit positions (for example, nodes 104 and 204 in FIGS. 1 and 2, respectively).

DETAILED DESCRIPTION

Operating principles for the present invention will be more fully understood according to the following detailed description.

FIG. 1 illustrates pertinent elements in a typical multicast network. Multicast network 100 comprises nodes 101, 102, 103, 104, 105 and 106, as well as arcs 112, 113, 123, 124, 125, 134, 135, 145, 146 and 156. Associated with each of the arcs 112, 113, 123, 124, 125, 134, 135, 145, 146 and 156 are a facilities cost 115 and a path delay 117. Each facilities cost 115 and path delay 117 relate to a portion of the multicast network defined by an associated arc and the two nodes interconnected by the arc.

Facilities cost 115 provides a measure of the relative cost incurred in reserving the path defined by an associated arc and its interconnected node pair. For example, in FIG. 1, a cost 115 of 10 units is incurred by arc 113 and its interconnected nodes 101 and 103. Similarly, path delay 117 provides a measure of delay incurred for traffic along the defined path. For example, as shown in FIG. 1, the path defined by arc 135 and nodes 103 and 105 incurs a delay 117 of 3 units.

In a given multicast network, the sum of the facilities costs associated with each of the arcs in the multicast network is indicative of the overall facilities costs for the network. For example, by summing each of the facilities costs 115 associated with the arcs 112, 113, 123, 124, 125, 134, 135, 145, 146 and 156 of the network 100 in FIG. 1, one determines an overall facilities cost for the network 100 of 45 units.

Network nodes 101, 104 and 105 are shaded to designate their status as "terminating nodes." Terminating nodes provide sole points of interconnection for multicast network participants (in other words, each participant is directly interconnected to at most one terminating node). As a result, for a multicast tree configured to support a multicast conference, the tree must include all terminating nodes associated with active multicast conference participants.

One network structure supporting a multicast conference is the so-called Steiner tree. A Steiner tree configures arcs, terminating nodes and other non-terminating nodes so that only a single network path is available between each pair of terminating nodes. In a so-called minimum Steiner tree, nodes and arcs are selected so that the sum of certain penalties (for example, such as facilities costs) associated with each selected node and arc minimized (see, e.g., Sanjoy Paul, op cit. at pg. 25). Any penalty function may be employed that can be defined with reference to each incrementally selected node and arc and summed to indicate an overall penalty for the Steiner tree.

FIG. 2 illustrates a minimum Steiner tree 220 configured in the network 200. Steiner tree 220 is defined by terminating nodes 201, 204, and 205, non-terminating node 202 and arcs 212, 224 and 225. An overall facilities cost 216 for the Steiner tree 220 is determined by summing cost labels associated with arcs 212, 224 and 225. As shown in FIG. 2, Steiner tree 220 has a facilities cost 216 of 4 units. This cost is less, for example, than the facilities cost associated with an alternate multicast tree defined by terminating nodes 201, 204 and 205, non-terminating node 203 and arcs 213, 234 and 235. For this alternate multicast tree, the facilities cost is 25 units.

While the minimum cost Steiner tree 220 provides a desirable network structure for multicast conferencing, such trees can be very difficult to construct directly in networks of any significant size (see, e.g., Frank K. Hwang et al., The Steiner Tree Problem, North-Holland, 1992, p 151). As a result, a number of heuristic methods have been developed which give approximate Steiner trees (typically referred to as a "close-to-optimal Steiner tree"). FIG. 3A depicts one such heuristic method, related to a method proposed by Maxemchuck (see Nicholas F. Maxemchuck, "Video Distribution on Multicast Networks," IEEE Journal on Selected Areas in Communications, Vol. 15, No. 3, April 1997, pp. 359–363).

In the heuristic method illustrated by FIG. 3A, an initial terminating node is randomly selected at step 302 to begin the tree. At step 304, the tree is initialized by labeling the selected tree node and all other nodes. Such node labeling may be practically accomplished, for example, in a data file containing records associated with the individual network nodes. In the initialization step 304, the tree node is labeled as with a tree node label (T), a permanent node label (P), and a penalty value of 0 units (indicating that the selected node has been added to the tree). At the same time, all other network nodes are labeled as having arbitrarily high penalty values (conceptually, penalties of infinite value), and have any pre-existing T or P labels removed.

At step 306, it is determined Whether any terminating nodes remain to be added to the tree. While at least one terminating node has not yet been added to the tree, the process proceeds at step 310 to perform an "update" function with regard to all tree nodes.

FIG. 3B illustrates the operation of the update function. The function begins at step 310a. At step 310b, a tree node m is selected for updating. At step 310c, each node that is directly adjacent to the tree node m (in other words, interconnected to m by a single arc) and that has not received a permanent label (P) is identified. One of the identified nodes is selected at step 310d, and a penalty value for the node is computed at step 310e based on penalty parameters associated with the selected tree node and with the arc directly interconnecting the identified node to the selected tree node. Typically, the penalty parameter values are assigned as labels for the tree node and the interconnecting arc.

At step 310f, the computed penalty value is compared to the value of the current penalty label for the identified node. If the computed value is less than the current value (at determined as step 310f), the current value is replaced by the computed value at step 310g. For example, for each identified node that is currently initialized with infinite penalty value, the current penalty value is replaced by the computed penalty value. As determined at step 310h, the process continues until a penalty has been computed and compared to the current value for each non-permanent (non-P) node directly adjacent to the selected tree node m.

As determined at step 310i, the update process continues until all directly adjacent nodes for each node m have been updated. The update process is completed at step 310j.

Returning to FIG. 3A, once the update process at step 310 has been completed, a non-P node is selected at step 312 having the lowest penalty value among all non-P nodes. In the event that more than one node is labeled with the lowest value, one of these nodes is chosen randomly. The selected node (denoted "minnode") is labeled as a P node.

At step 314, it is determined whether minnode is a terminating node. If it is not a terminating node, the update function previously described with respect to FIG. 3B is performed, with minnode as the only updated node m. The process then resumes at step 312 to determine a lowest penalty value among all nodes not labeled with the value P.

If it is determined at step 314 that minnode is a terminating node, the process proceeds to identify minnode and any other nodes on the path interconnecting minnode to the current tree as new tree nodes. The process then returns to step 304, and the tree is reinitialized such that the new tree nodes receive T and P labels, as well as penalty labels of 0 units. All other non-tree (non-T) network nodes are labeled as having arbitrarily high penalty values (conceptually, penalties of infinite value), and any pre-existing P labels associated with these nodes are removed. Note that any pre-existing T labels were removed from all nodes at the first initialization step 304.

As determined at step 306, while at least one terminating node has not been added to the tree, the process proceeds at step 310. If all terminating nodes have been added as tree nodes, the process completes at step 308.

The method of FIGS. 3A and 3B is heuristic, and will produce a so-called close-to-optimal Steiner tree. Although bounds for this method have not yet been fully evaluated, our experience suggests, for example, that a close-to-optimal Steiner tree having facilities cost as a penalty function will be within a factor of 2 of the true Steiner tree optimum.

Returning to FIG. 2, the Steiner tree 220 has been selected to minimize overall facilities costs. The selected tree may or may not meet other important performance constraints. For example, in FIG. 2, multicast conference participants desire a maximum delay T (218) between any two conference participants that is no greater than 10 units. However, the selected Steiner tree 220 exhibits a maximum expected delay τ 219 of 13 units (the sum of delay label values for arcs 212 and 225 between terminal nodes 201 and 205).

Accordingly, since Steiner tree 220 fails to meet the desired delay constraint, an alternate selection method is required to produce a Steiner tree with low penalty subject to the constraint (a so-called constrained Steiner tree).

One important aspect of the invention directed to address the delay constraint and produce low penalty is to transform the delay constraint into an additional element that can be incorporated in the penalty function. This approach borrows from Lagrangian relaxation techniques used in the solution of linear programming problems (see, e.g., R. K. Ahuja et al., *Network Flows: Theory, Algorithms, and Applications*, Prentice Hall, 1993, pp. 598–638).

By way of analogy to Lagrangian relaxation, for example, a modified penalty function $C_{Mod, i, j}$ incorporates the delay constraint associated with the Steiner tree 200 of FIG. 2 as follows:

$$C_{Mod, i, j} = C_{i,j} + \mu(T_{i,j}) \tag{1}$$

Where:
$C_{i,j}$ is the facilities cost associated with the path between nodes i and j, $T_{i,j}$ is the delay associated with the path between nodes i and j, and $\mu$ is a "toll" factor used to adjust the relative importance of delay to the modified cost function.

A close-to-optimal Steiner tree selection method (such as the method described in FIGS. 3A and 3B) that further employs $C_{Mod, i, j}$ as the penalty function would tend to produce a Steiner tree that reduces both the sum of the facilities costs and the sum of the path delays for the incrementally selected directly adjacent nodes. However, such an approach might not be effective, as the sum of the incremental path delays may not directly correlate with a tree-level delay constraint such as maximum expected end-to-end delay τ between any two terminating nodes in the Steiner tree.

Figure 4:
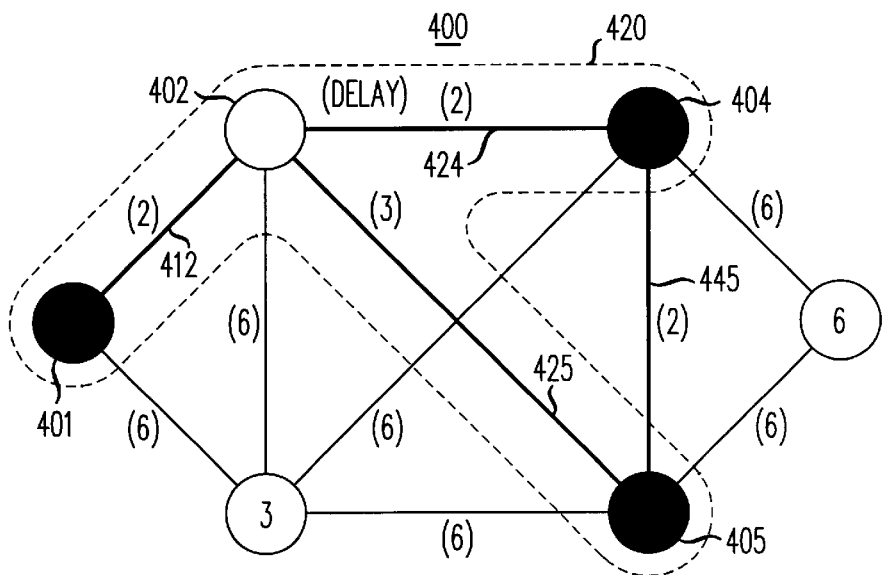
FIG. 4 shows a second multicast network with associated facilities costs and delays, including a second Steiner tree selected to minimize end-to-end delay between any two nodes in the tree.

Consider the multicast network 400 illustrated in FIG. 4. In the network 400, Steiner tree 420 is selected to minimize maximum expected end-to-end delay between any two of the tree nodes 401, 402, 404 and 405 interconnected by arcs 412, 424 and 425. As selected, maximum end-to-end delay τ is incurred on the path between non-adjacent nodes 401 and 405 (defined by node 402 and arcs 412 and 425). The maximum expected end-to-end delay τ is 5 units (the sum of a delay of 2 units associated with arc 412 and a delay of 3 units associated with arc 425). The sum of the path delays for Steiner tree 420 is 7 units (the sum of the delays associated with arcs 412 and 425, plus a delay of 2 units associated with arc 424).

The sum of the path delays for directly adjacent paths in Steiner tree 420 can be reduced by replacing the directly adjacent path between nodes 402 and 405 (defined by arc 425) with a directly adjacent path between nodes 404 and 405 (defined by arc 445). The sum of path delays for this configuration is 6 units (1 unit less than the sum of path delays for Steiner tree 420). However, this same configuration results in a maximum end-to-end delay τ of 6 units (between nodes 401 and 405, the sums of delays associated with arcs 412, 424 and 445), 1 unit more than the maximum end-to-end delay τ of 5 units for Steiner tree 420.

Thus, there is a need to revise the path delay component of $C_{Mod, i, j}$ so that it better reflects the effect on maximum expected end-to-end delay τ that results from incrementally adding each directly adjacent node to the Steiner tree.

In order to meet this need, an important aspect of the present invention consists of a new incremental path delay metric. The new metric, delta diameter ($\delta_{i,j}$), tracks the change in maximum end-to end delay $\tau$ that results from adding a directly adjacent node to a Steiner tree. Delta diameter $\delta_{i,j}$ may be determined as a function of node diameters and tree diameters, which are in turn defined and determined as follows.

In a given Steiner tree, node diameter $nd_i$ is defined to represent the maximum distance between node i and any other node in the tree (here, "distance" is used to represent the value of a selected penalty parameter, such as delay). Node diameter may be determined as a function of distance labels associated with arcs interconnecting nodes in the tree (for example, cost labels 115 and delay labels 117 of FIG. 1).

Figure 5A:
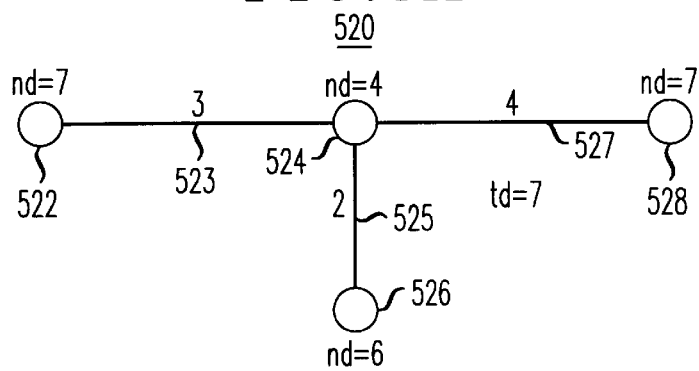
FIG. 5A depicts a third Steiner tree with associated node diameters.
Figure 5B:
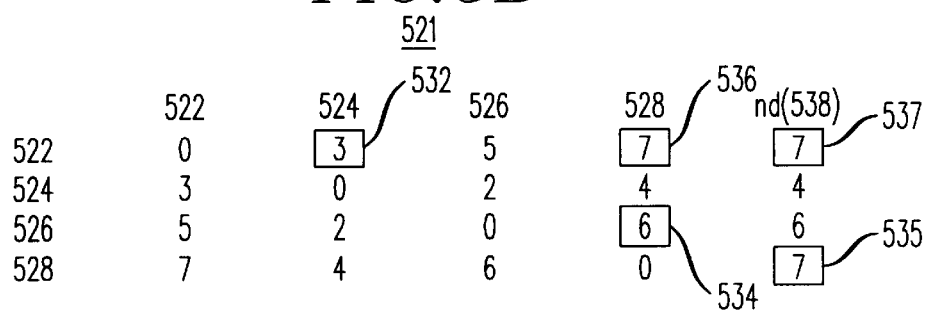
FIG. 5B depicts a table for tracking tree diameter and node diameters for Steiner tree 520 of FIG. 5A.

FIG. 5B illustrates how the node diameters $nd_i$ may be determined for Steiner tree 520 of FIG. 5A. Steiner tree 520 comprises four nodes (522, 524, 526 and 528) and three arcs (523, 525 and 527). The arcs 523, 525 and 527 have distance labels of 3 units, 2 units and 4 units, respectively.

In FIG. 5B, a distance table 521 has columns and rows associated with each of the nodes 522, 524, 526 and 528 of Steiner tree 520. Each cell in the distance table 521 stores a value indicating the distance between the two nodes identified by the cell's associated column and row. For example, cell 532 contains the value 3, representing a distance of 3 units between directly adjacent nodes 522 and 524. Node 522 and node 524 are respectively associated with the row and column of table 521 that define cell 532.

Similarly, cell 534 contains the value 6, reflecting a distance of 6 units between nodes 526 and 528. Nodes 526 and 528 are not directly adjacent in the Steiner tree 520 of FIG. 5A. Accordingly, the distance between nodes 526 and 528 (6 units) are determined by summing the distance label values for each directly adjacent node pair between nodes 526 and 528. In this case, summing the distance label value associated with directly adjacent nodes 524 and 526 (2 units) together with the distance label value associated with directly adjacent nodes 526 and 528 (4 units) produces the distance value of 6 units.

Node diameter $nd_i$ for a given node i may be determined by finding the maximum cell distance value in the table row associated with the node i. For example, for node 522, cell 536 contains the maximum distance value of 7 units. Node diameters are determined for each node associated with a row in table 521, and are stored in a corresponding cell in the node diameter column 538.

Tree diameter $td_s$ is defined as the maximum node diameter for the tree. As, shown in table 521 of FIG. 5B, tree diameter $td_s$ may accordingly be determined as the maximum of the cell values contained in node diameter column 538. As indicated by cells 537 and 535 in column 538, tree diameter $td_s$ for Steiner tree 520 of FIG. 5A is 7 units.

FIG. 6A illustrates Steiner tree 620, which is modified from Steiner tree 520 of FIG. 5A by the addition of node 630 and arc 629. FIG. 6B depicts an associated distance table 621, which updates the distance table 521 of FIG. 5B to reflect the addition of node 630 to Steiner tree 620. Distance table 621 updates distance table 521 by adding both an additional row and an additional column to reflect the addition of node 630, by computing the distance values for the additional row and additional column, and by updating the node diameter column 638 as required with a new maximum value for each row in the distance table 621.

Since node 630 interconnects to directly adjacent node 628 via arc 629, distance values for the additional row and additional column can be readily computed from distance values for node 628 according to the following formula:

$$D_{i,j}=D_{i,k}+D_{k,j} \quad (2)$$

Where:

$D_{i,j}$ is distance between added node i and tree nodes j, $D_{i,k}$ is the distance between added node i and directly adjacent tree node k, and $D_{k,j}$ is the distance between directly adjacent node k and all other tree nodes j.

Applying equation (2) to the above example, node i is node 630, node k is node 628 and nodes j are each of nodes 622, 624, and 626. Equation (2) can be repeatedly used to compute distance values, for example, as P nodes are incrementally selected over an associated tree path interconnected to tree node k. Associated columns and rows may be added to the table 621 of FIG. 6B to store distance values relating to the selected nodes.

Once distance values with respect to the selected node 630 are computed using equation (2) and are appropriately placed in an associated row and an associated column of FIG. 6B, column 638 of FIG. 6B may be updated. Node diameters in column 638 are updated by determining the maximum cell value in each row of table 621, among columns associated with nodes. For example, the node diameter value expressed in cell 644 for the row associated with node 622 corresponds to a maximum cell value expressed in cell 642. Cell 642 is a member of the column associated with node 630, and therefore represents the distance between nodes 622 and 630. This same distance is shown in cell 640 (associated by row with node 630 and by column with node 622), and is expressed in cell 646 of the node diameter column. Tree diameter, determined as the maximum node diameter value (the maximum node diameter value expressed in column 638), is therefore 8 units.

Node diameters and tree diameters as calculated, for example, in tables 5B and 6B may be further used to calculate the end-to-end delay metric delta diameter $\delta_{i,j}$. An important element of the present invention, delta diameter functions to track the change in maximum expected end-to-end delay $\tau$ that results from adding a selected node to Steiner tree S. For a given Steiner tree $S_1$ delta diameter may be determined as:

$$\delta_{i,j}=\max\{D_{i,j}+nd_j, td_s\}-td_s \quad (3)$$

Where:

$D_{i,j}$ is distance between selected node i and existing tree node j in Steiner tree S, $nd_j$ is the node diameter for tree node j in existing Steiner tree S, and $td_s$ is the tree diameter for existing Steiner tree S.

The operation of equation (3) is illustrated by reference to Steiner tree 720 of FIG. 7A. FIG. 7A illustrates several P nodes (nodes 731, 733 and 735) that have been selected for possible inclusion in Steiner tree 720. Path 736 directly interconnects node 731 to tree node 726, and has an associated distance label $D_{731, 726}$ equal to 2 units. $D_{731, 726}$ represents the distance between P node 731 and tree node 726. Node diameter $nd_{726}$ for tree node 726 is 6 units, and tree diameter $td_s$ for Steiner tree 720 is 7 units. Applying equation (3), $\delta_{731, 726}$ is 1 unit. As shown in FIG. 7A, once calculated, the value of $\delta_{731, 726}$ is assigned as an additional label for arc 736.

If, for example, candidate node 731 is added to the Steiner tree 720 as a terminating tree node, $td_s$ (7 units) will increase by the value of $\delta_{731, 726}$ (1 unit) to $td'_{i,s}$ (8 units) according to the following equation.

$$td'_{i,s}=td_s+\delta_{i,s} \quad (4)$$

Where:
   td'$_{i,s}$ is tree diameter of the Steiner tree S after node i has been added,
   td$_s$ is-tree diameter of the Steiner tree S before node i has been added, and
   δ$_{i,s}$ is delta diameter for node i added to Steiner tree S, computed according to equation (3).

P nodes 733 and 735 of FIG. 7A are also selected for possible addition to Steiner tree 720. Node 733 interconnects to node 731 via arc 739, and node 735 interconnects to node 733 via arc 741. Delta diameters associated with arcs 739 and 741 may be calculated in a like manner to the previous delta diameter calculation for arc 736. For example, D$_{733, 726}$ represents the distance between P node 733 and tree node 726, and is calculated as the sum of the distance labels associated with arc 739 (D$_{733, 731}$) and arc 736 (D$_{731, 726}$) to be 5 units. As previously determined, nd$_{726}$ is 6 units and td$_s$ is 7 units. Applying equation (3), δ$_{733, 726}$ is calculated to be 4 units, and is assigned as an additional label for arc 739. Similarly, δ$_{735, 726}$ (associated with arc 741) is be calculated as 5 units and assigned as a label for arc 741.

FIGS. 7B, 7C and 7D illustrate incremental updating of a table that records node distances, node diameters, tree diameters and delta diameters associated with Steiner tree 720. For example, FIG. 7B records information about tree nodes 722, 724, 726 and 728, and P node 731. In FIG. 7B, a row and a column are included for each of these nodes.

As in FIGS. 5B and 6B, each cell in FIGS. 7B through 7D that lies at the intersection of a nodal row and nodal column contains a value representing the distance between the associated two nodes. For example, cell 750 contains a distance label value of 2 units, which represents the distance between associated nodes 726 and 731 (D$_{731, 726}$). As previously described, distance label values for each cell in the added rows and columns associated with candidate nodes 731, 733 and 735 may be determined using equation (2).

Columns are also included in each of the tables of FIGS. 7B, 7C and 7D to record node diameters nd$_j$ (for example, nd$_{726}$ of 6 units shown in cells 752) and tree diameter td$_s$ (7 units, shown in cells 754). In addition, delta diameters δ$_{i, j}$ (δ$_{731, 726}$, δ$_{733, 726}$, and δ$_{735, 726}$ respectively shown as cells 756, 758 and 760) are recorded in associated delta diameter columns.

Appropriate values for D$_{i, j}$, nd$_j$, and td$_s$ may be determined from the tables in FIGS. 7B, 7C and 7d and used in conjunction with equation (3) to determine δ$_{i,j}$. For example, in the table of FIG. 7C for selected node 733, D$_{733, 726}$ is captured in cell 762 as 5 units, nd$_{726}$ is captured in cell 752 as 6 units, and td$_s$ is captured in cell 754 as 7 units. Using equation (3), δ$_{733, 726}$ is determined to be 4 units, and recorded accordingly in cell 758.

Similarly, in the table of FIG. 7D for selected node 735, D$_{735, 726}$ is captured in cell 764 as 6 units, nd$_{726}$ is captured in cell 752 as 6 units, and td$_s$ is captured in cell 754 as 7 units. Using equation (3), δ$_{735, 726}$ is determined to be 5 units, and recorded accordingly in cell 760. Note that δ$_{i, j}$ for the preceding P nodes may also be recorded in the table. For example, in FIG. 7D, in addition to the recording of δ$_{735, 733}$ in cell 760, δ$_{731, 726}$ and δ$_{733, 726}$ are respectfully recorded in cells 756 and 758.

Importantly, and as illustrated by the example presented in FIGS. 7A through 7D in conjunction with equation (4), delta diameter provides a means for incrementally determining tree diameter once a terminating node is selected and added together with any intervening P nodes on an associated potential tree path to Steiner tree 720. Using this approach, a logically separate table is constructed for each potential tree path of one or more P nodes interconnected to the tree.

For example, if node 737 directly adjacent to tree node 728 of FIG. 7A is selected as a P node, the table of FIG. 7E would be created to record the selection of P node 737. As shown in the table of FIG. 7E, D$_{737, 728}$ is captured in cell 770 as 5 units, nd$_{728}$ is captured in cell 772 as 7 units, and td$_s$ is captured in cell 774 as 7 units. Using equation (3), δ$_{737, 728}$ is determined to be 5 units, and recorded accordingly in cell 776. Other nodes subsequently selected as P nodes and interconnected to tree node 728 via P node 737 would be represented by additional row and column entries to the table of FIG. 7E.

Consistent with step 304 of FIG. 3A, once a series of P nodes in an associated potential tree path that are captured in a single logical table are added to the tree, any other logical tables associated with other P node paths are discarded. The tree node table is updated to include entries for the additional tree nodes, and serves as the "root" for creating subsequent P node tables. A tree node table incorporating the candidate node 737 of FIG. 7A is shown in FIG. 7F. As shown in the table of FIG. 7F, new tree diameter td'$_s$ (cell 780) of 12 units can be computed as the maximum of the cell values in the node diameter column 778, or alternatively from the table of FIG. 7F using equation (4).

Incorporating delta diameter δ$_{i,j}$ as a penalty parameter, the modified penalty function C$_{Mod, i, j}$ expressed in equation (1) may be reformulated as revised modified penalty function C$_{Rev, i,j}$, defined as:

$$C_{Rev, i,j} = \eta(C_{i, j}) + \mu(\delta_{i,j}) \quad (5)$$

Where:
   C$_{i, j}$ is the facilities cost associated with the path between interconnected nodes i and j, and
   η and μ are "toll" factors used to adjust the relative importance of delay to C$_{Rev, i, j}$.

A second toll factor η is added to C$_{Rev, i j}$ in equation (5) in order to provide an increased ability to emphasize either facilities cost or delta diameter in the equation. The extent to which end-to-end delay is emphasized by C$_{Rev, i, j}$ will depend on values selected for toll factors η and μ. Specifically, as η decreases and/or μ increases, C$_{Rev, i, j}$ places increased emphasis on delta diameter, and thereby on end-to-end delay.

Figure 8:
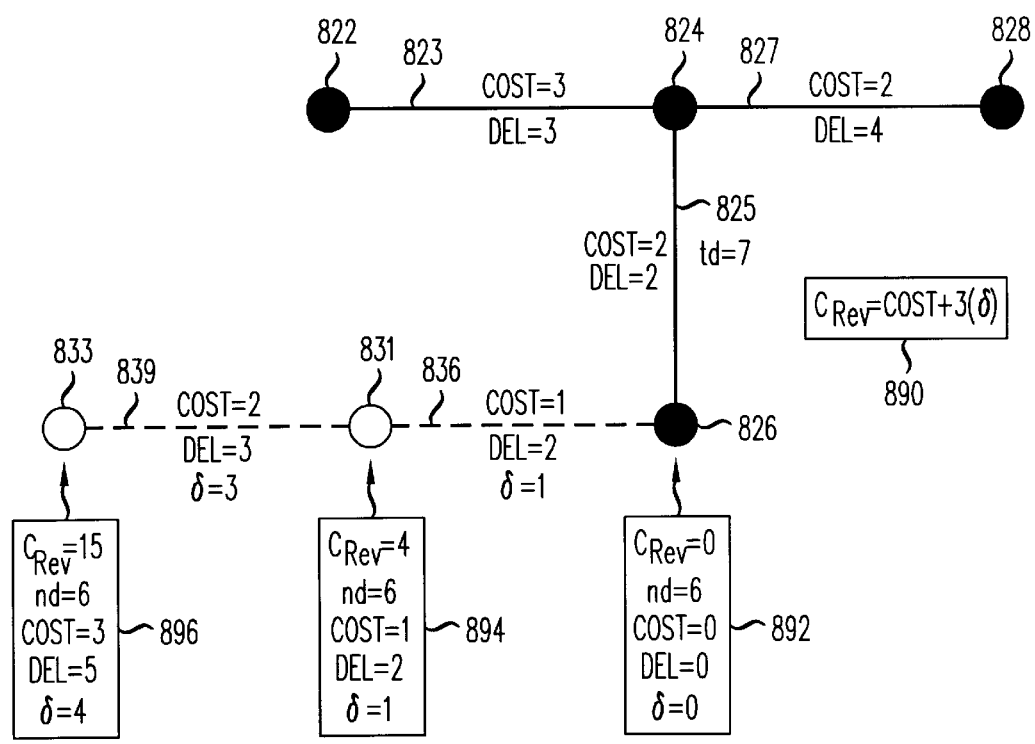
FIG. 8 depicts the labeling of nodes selected for possible addition to a Steiner tree 820 based on a revised modified penalty function $C_{Rev, i, j}$ incorporating delta diameter.

FIG. 8 illustrates how revised minimum penalty function C$_{Rev, i, j}$ may be used in the context of the method described in FIGS. 3A and 3B. In FIG. 8, Steiner tree 820 includes tree nodes 822, 824 and 828 and arcs 823, 825 and 827. Consistent with equation (5), C$_{Rev, i, j}$ for Steiner tree 820 is shown in equation 890 as having toll factors η and μ respectively equal to 1 and 3.

All penalty parameters for node 826 are set to 0 in step 304 of FIG. 3A (as shown in box 892 of labels associated with node 826). Cost and delay parameters for arc 836 are known and non-changing.

Consistent with steps 310 and 312 of the method illustrated in FIGS. 3A and 3B, node 831 is selected and labeled as a P node. Consistent with step 310e of FIG. 3B, the penalty C$_{Rev, 831, 826}$ associated with P node 831 is determined based on penalty parameters associated with interconnecting tree node 826 and interconnecting arc 836. Delta diameter δ$_{831, 826}$ for arc 836 is calculated using equation (3) to be 1 unit. Using equation (5), C$_{Rev, 831, 826}$ is calculated to be 4 units (as shown in box 894 indicating labels associated with node 831).

In a second iteration of steps 310 and 312, node 833 is selected and labeled as an additional P node. Delta diameter $\delta_{833,\,826}$ is calculated using equation (3) by computing delay distance $D_{831,\,826}$ as the sum of delays associated with arcs 839 and 836 (5 units) and by computing the facilities cost $C_{833,\,826}$ as the sum of facilities costs associated with arcs 833 and 831 (3 units). Applying equation (3), $\delta_{833,\,826}$ is calculated to be 4 units (as shown in box 896 indicating labels associated with node 833). Applying equation (5), $C_{Rev,\,833,\,826}$ is computed to be 15 units.

As additional P nodes are selected and extend the path defined by nodes 831 and 833, an increasing number of arc labels must be retrieved in order to compute associated delay distances $D_{i,\,j}$ and facilities costs $C_{i,\,j}$. Alternatively, as shown in FIG. 8, labels for $D_{i,\,j}$ and $C_{i,\,j}$ can be stored in association with each selected P node so that an additionally selected P node need only sum labels associated with its interconnecting arc and the P node directly interconnected to this arc. For example, to compute delay distance $D_{831,\,826}$ associated with node 833, delay distances labels need be summed only for arc 839 and node 831 (labels for node 831 are represented in box 894).

The method described by FIGS. 3A, 3B and 8 enables a close-to-optimal, constrained Steiner tree to be selected by employing revised penalty function $C_{Rev\,i,\,j}$ as defined by equation (5). This method, however, does not provide for the selection of values to be used as toll factors $\eta$ and $\mu$ in equation (5). Selection of values for toll factors $\eta$ and $\mu$ will have a significant effect both on facilities cost $C_{i,\,j}$, and on whether tree diameter $td_s$ meets end-to-end delay constraint T.

Figure 9:
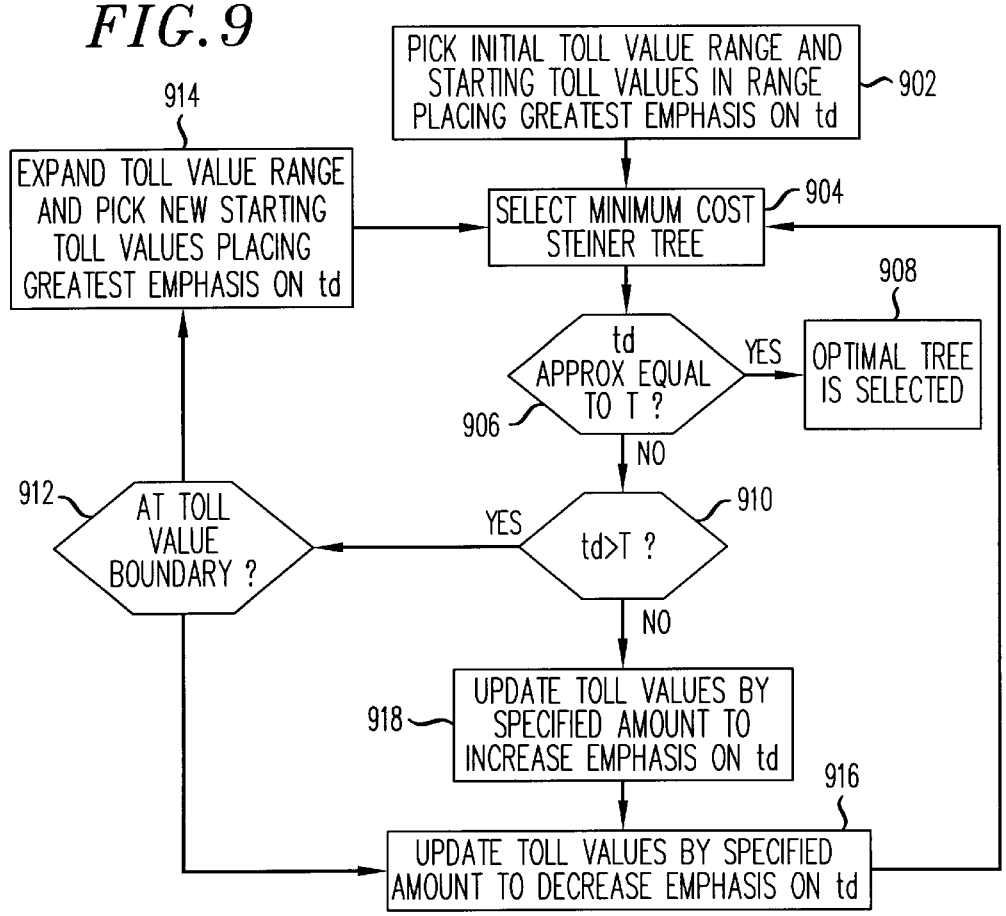
FIG. 9 depicts a search method for selecting toll factors for the revised modified cost function $C_{Rev, i, j}$ introduced in FIG. 8.

FIG. 9 presents a method for selecting toll factors $\eta$ and $\mu$ based on a region-elimination optimization method such as the binary search. In step 902, initial values for toll factors $\eta$ and $\mu$ are selected, typically based on experience with toll factors used previously (for example, in configuring a similar multicast conference tree). For networks containing as many as 80 nodes (of which as many as 16 may be terminating nodes) and 400 arcs, setting $\eta$ equal to 1 and operating $\mu$ over a range of 0 to 1024 has proven to be a reasonably successful strategy.

After selecting an initial range and starting values for toll factors $\eta$ and $\mu$, a close-to-optimal Steiner tree is selected in step 904, for example, according to the method illustrated FIGS. 3A, 3B and 8. Tree diameter $td_s$ is evaluated. If $td_s$ is equal to the end-to-end delay constraint T (within acceptable limits), the process concludes in step 908 as an acceptable tree has been selected. If $td_s$ is greater than end-to-end delay constraint T and values for toll factors $\eta$ and $\mu$ are at a boundary that provides maximum emphasis on delta diameter $\delta_{i,j}$, the process moves at step 914 to expand the toll factor range and select new starting values. The process then moves to step 904 to select another minimum cost Steiner tree.

If $td_s$ is greater than end-to-end delay constraint T and values for toll factors $\eta$ and $\mu$ are not yet at a toll factor range boundary, the process moves in step 916 to select new toll factor values nearer a toll factor boundary that places more emphasis on delta diameter $\delta_{i,j}$. For example, if $\eta$ is set equal to 1, and $\mu$ ranges from 0 to 1024 and has a current value of 512, a new value of 768 may be selected for $\mu$ (halfway between the current value and the boundary placing greatest emphasis on delta diameter $\delta_{i,j}$).

Alternatively, if it is determined in steps 906 and 910 that $td_s$ is neither greater than nor equal to end-to-end delay factor T, the process moves in step 918 to select new toll factor values nearer a toll factor boundary that places less emphasis on delta diameter $\delta_{i,j}$. For example, citing the previous example where $\eta$ is set equal to 1, and $\mu$ may range from 0 to 1024 and has a current value of 512, a new value of 256 may be selected for $\eta$ (halfway between the current value and the boundary placing least emphasis on delta diameter $\delta_{i,j}$).

As an alternative to toll factors $\eta$ and $\mu$, equation (5) may be reformulated as:

$$C_{Rev,\,i,j} = \alpha(C_{i,\,j}) + (1-\alpha)(\delta_{i,j}) \qquad (6)$$

Where:
$\alpha$ is a toll factor having a value on the interval [0,1]

Equation (6) provides the advantage of providing clear toll factor boundaries of 0 and 1 without limiting the extent to which $C_{i,\,j}$ or $\delta_{i,j}$ may be emphasized with respect to each other. For example, by selecting $\alpha$ equal to either 1 or 0, $C_{Rev,\,i,\,j}$ respectively places full emphasis on either $C_{i,\,j}$ or $\delta_{i,j}$.

Figure 10:
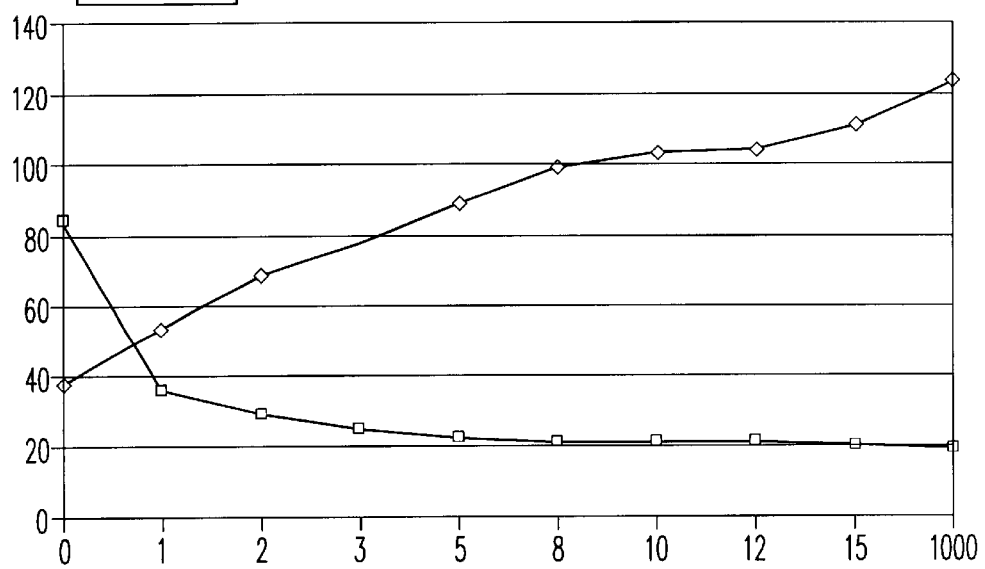
FIG. 10 shows facilities costs and delays as a function of toll factor, for Steiner trees selected in a simulated network.

FIG. 10 shows cost and delay for a simulated network example where $C_{Rev,\,i,j}$ sets $\eta$ equal to 1. The simulated network contains 40 nodes (of which 8 are terminating nodes) and 200 arcs, and $\mu$ ranges from 0 to 1000. For $\mu$ equal to 0 (equivalent to no delay constraint), a close-to-optimal constrained Steiner tree is selected having a cost of approximately 38 units and a delay of approximately 84 units. For $\mu$ equal to 1000, a close-to-optimal constrained Steiner tree is selected having a cost of approximately 123 units and a delay of approximately 19 units. A reasonable compromise may be found at 1 equal to 1, where the delay is more than halved to about 37 units while cost is increased by only about 45 percent to 55 units.

The exemplary embodiment described above is but one of a number of alternative embodiments of the invention that will be apparent to those skilled in the art in view of the foregoing description. Accordingly, this description is to be construed as illustrative only, and is for the purpose of teaching those skilled in the art the best mode of carrying out the invention. It is therefore to be understood that changes may be made in the particular embodiments of the invention which are within the scope and spirit of the invention as outlined by the appended claims. For example, the method of FIG. 3 might alternatively add to step 316 a test to determine whether end-to-end delay exceeds the constraint T, and if so, to terminate the process and select a next $\eta$ and $\mu$ according to the method described in FIG. 9. Further, as an alternative to termination, the process may be modified to determine a next lowest penalty path to the tree and continue. An additional embodiment of the present invention could specify that close-to-optimal Steiner trees be selected starting at each terminating node, and that the Steiner tree having the lowest penalty among these selected trees be chosen as the multicast network tree. Other penalty parameters that may be incrementally defined and summed to determine an overall tree penalty (for example, bandwidth capacity) may also be alternatively included as part of the penalty function C. Penalty parameters that may have a transform that can be summed to determine an overall tree penalty (for example, jitter) may also be considered. Additionally, multiple ones of these penalty parameters may be included in a single penalty similar to equation (5) by adding these parameters as additional terms of the equation together with appropriate toll factors.

We claim:

1. A method for configuring a communications network to route traffic in a multicast conference call by establishing a multicast network tree that includes elements selected from among a first plurality of network nodes for terminating multicast conference participants, a second plurality of non-terminating network nodes, and a plurality or arcs that each interconnect a pair of nodes selected from among the first and second pluralities, wherein an expected delay is known for traffic routed between each node pair interconnected by one of the plurality of arcs, and wherein a delay τ represents the maximum expected delay for traffic routed between any two nodes in the tree, the method comprising steps of:

initializing the tree with one of the first plurality of terminating nodes; and while one or more of the first plurality of terminating nodes has not been added to the tree, selecting incrementally one or more potential tree nodes and arcs that are associated with one or more potential tree paths, wherein each potential tree node is selected from one of the first and second pluralities of nodes and each potential tree arc is selected from the plurality of arcs, such that the selected node and arc add a least additional penalty to the current tree over an associated potential tree path; the penalty being determined as a function of a delta diameter δ, wherein δ, represents the increase in τ that would result from adding the selected node and arc and any other potential tree nodes and potential tree arcs in the associated potential tree path to the current tree; and when a selected potential tree node is a terminating node, adding each potential tree node and arc in the associated potential tree path to the current tree.

2. The method of claim 1, wherein the configured tree approximated a so-called minimum cost Steiner tree.

3. The method of claim 1, wherein potential tree nodes and arcs in other than the associated potential tree path of a selected terminating node are released after the step of adding each potential node and arc in the terminating node associated path to the tree.

4. The method of claim 1, wherein, in the initializing step, more than one node is selected from the first and second pluralities and one or more of the plurality of arcs that interconnect the selected nodes are selected in order to initialize the tree.

5. The method of claim 1, wherein the associated tree penalty is defined to be δ.

6. The method of claim 1, wherein the associated tree penalty is defined to be $$\eta(c)+\mu(\delta),$$

wherein c is a facilities cost associated with the selected node and arc and η and μ are toll factors.

7. The method of claim 6, wherein η is equal to 1.

8. The method of claim 6, wherein η and μ are selected using a region elimination search method, the region elimination search method being operative to select and evaluate values of η and μ such that maximum delay τ for a multicast tree configured using an associated penalty function having the selected values of η and μ approaches a tree daily limit T.

9. The method of claim 8, wherein the region elimination search method is a binary search method.

10. The method of claim 9, wherein, η is set to have a value equal to 1 and μ is selected to have a value ranging from 0 to 1024.

11. The method of claim 9, wherein η is set equal to α and μ is set equal to (1−α), and wherein α is selected to have values on the interval 0,1.

12. The method of claim 1, wherein δ is defined to be $$\max\ \{D_{i,j}+nd_j,td_s\}-td_s,$$

wherein $D_{i,j}$ is the expected delay that would be introduced over an added path between potential tree node i and tree node j, $td_s$ is maximum expected delay τ between any two terminating nodes in the current tree, and $nd_j$ is maximum delay between the tree node j and any other terminating node in the current tree.

13. A method for configuring a telecommunications network to route traffic in a multicast conference call by establishing a multicast network tree that includes elements selected from among a first plurality of nodes for terminating multicast conference participants, a second plurality on non-terminating nodes and a plurality or arcs that each interconnect node pairs selected from among the first and second pluralities, wherein an expected delay is known for traffic routed between each node pair interconnected by one of the plurality of arcs, and wherein a delay τ represents the maximum expected transmission delay for traffic routed between any two tree nodes, the method comprising:

a) selecting an initial tree (T) node from the first plurality of terminating nodes;

b) labeling the selected node both as permanent (P) node and as a T node; and c) while one or more of the first plurality of terminating nodes has not been added to the tree, d) determining for each non-P node directly adjacent to a P node a delta diameter δ associated with a potential tree path linking the non-P node via the directly adjacent P node to the current tree, wherein the non-P node and P node are interconnected by one of the plurality of arcs and δ represents the increase in maximum expected transmission delay τ between any two nodes in the tree that would result from adding the non-P node to the treed via the potential tree path, e) calculating a penalty for each directly adjacent non-P node as a function of delta diameter, f) selecting a directly adjacent non-P node and interconnecting arc having a minimum penalty value among directly adjacent non-P nodes, and g) if the selected non-P node is a terminating node, h) adding to the current tree the selected node and arc and any other P nodes and arcs interconnecting the selected node and selected arc to the tree, i) labeling each of the added nodes as T nodes, j) removing P labels from all P nodes that are not labeled as T nodes, and k) returning to step c), and l) if the selected potential node is not a terminating node, m) labeling the selected node a P node, and n) returning to step c).

* * * * *